United States Patent [19]
Fukiura et al.

[11] Patent Number: 5,277,068
[45] Date of Patent: Jan. 11, 1994

[54] CAPACITIVE PRESSURE SENSOR AND METHOD OF MANUFACTURING THE SAME

[75] Inventors: Takeshi Fukiura; Shigeo Kimura; Yoshiyuki Ishikura; Ikuo Nishimoto, all of Kanagawa, Japan

[73] Assignee: Yamatake-Honeywell Co., Ltd., Japan

[21] Appl. No.: 771,507

[22] Filed: Oct. 4, 1991

[30] Foreign Application Priority Data

Oct. 5, 1990 [JP]  Japan ................................. 2-266689

[51] Int. Cl.⁵ ............................................... G01L 9/12
[52] U.S. Cl. ........................................ 73/724; 73/718; 361/283.1
[58] Field of Search ................ 73/718, 724, 721; 29/25.41; 361/283

[56] References Cited

U.S. PATENT DOCUMENTS

| | | | |
|---|---|---|---|
| 4,434,451 | 2/1984 | Delatorre | 361/283 |
| 4,998,179 | 3/1991 | Grantham et al. | 361/283 |
| 5,029,479 | 7/1991 | Bryan | 73/721 |

FOREIGN PATENT DOCUMENTS 63-305229  12/1988  Japan .

*Primary Examiner*—Donald O. Woodiel
*Attorney, Agent, or Firm*—Blakely, Sokoloff, Taylor & Zafman

[57] ABSTRACT

In a capacitive pressure sensor and a method of manufacturing the same, first and second grooves are formed in one and the other surfaces of a substrate, respectively. A first sacrificial layer is embedded in the first groove. First insulating films are formed on the substrate in which the first sacrificial layer is formed. The first insulating films have a first film electrode stacked therebetween. A second sacrificial layer having a predetermined shape is stacked on the first insulating film. Second insulating films are formed on the first insulating film on which the second sacrificial layer is formed. The second insulating films have a second film electrode stacked therebetween. A pressure introducing hole is formed in the second groove formed in the other surface of the substrate to reach the first sacrificial layer. First and second hollow portions are formed by removing the first and second sacrificial layers.

12 Claims, 5 Drawing Sheets

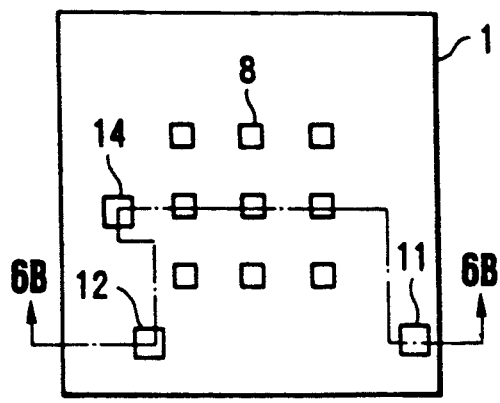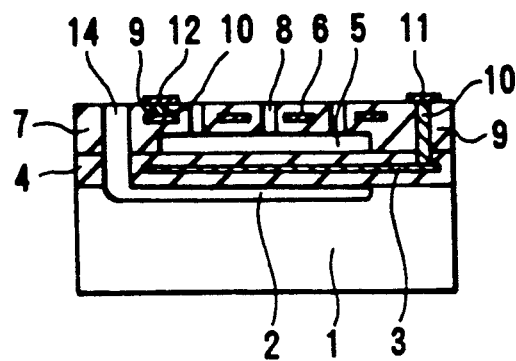
FIG.6A  FIG.6B
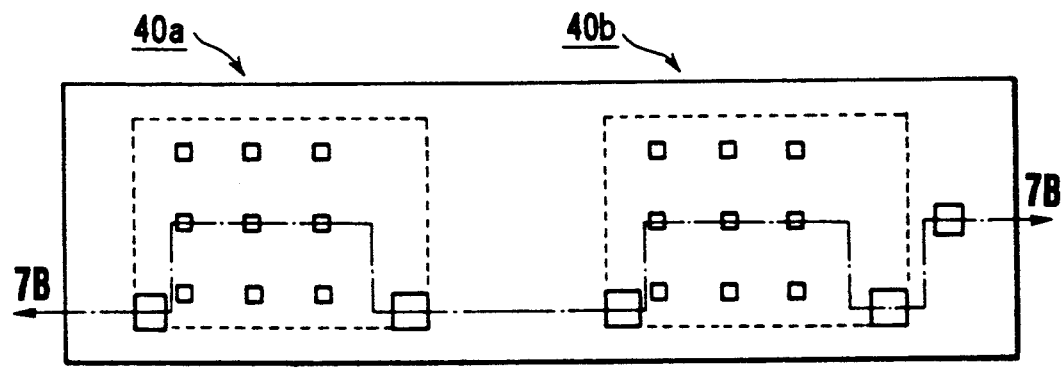
FIG.7A
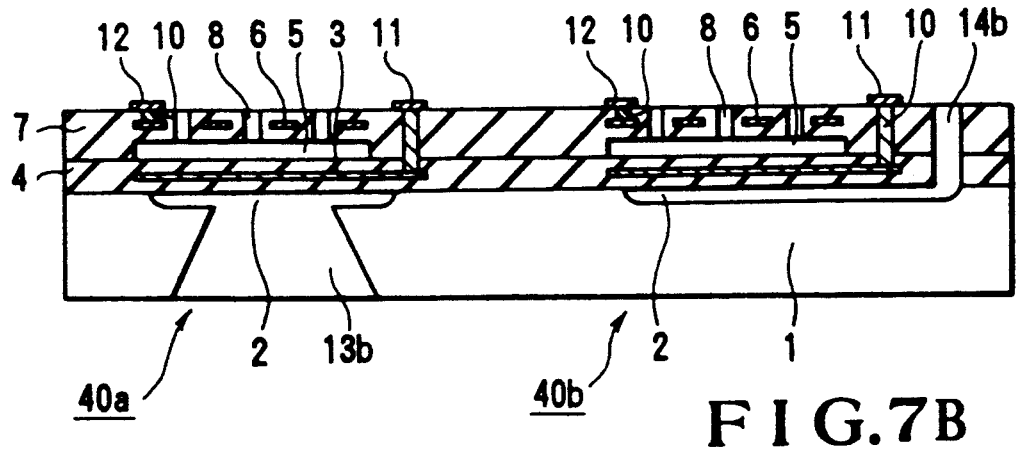
FIG.7B

CAPACITIVE PRESSURE SENSOR AND METHOD OF MANUFACTURING THE SAME

BACKGROUND OF THE INVENTION

The present invention relates to a capacitive pressure sensor having a diaphragm structure and designed to capacitively detect a change in measurement pressure, and a method of manufacturing the same.

FIG. 8 shows the arrangement of a capacitor structure of a capacitive pressure sensor of this type disclosed in, e.g., Japanese Patent Laid-Open No. 63-305229. Referring to FIG. 8, a capacitor structure for a pressure converter is constituted by a support base plate 53 formed by bonding a glass wafer 52 to the upper surface of a silicon wafer 51, a first capacitor plate 54 and second capacitor plates 55a and 55b formed on the upper surface of the support base plate 53, a diaphragm 57 having hollow portions 56a and 56b formed in its lower and upper surfaces and arranged on the support base plate 53, a silicon wafer 59 having a glass wafer 58 bonded to its lower surface and arranged on the diaphragm 57, and a pressure introducing through hole 60 extending through the glass wafer 58 and the silicon wafer 59.

Since the conventional capacitive pressure sensor is constituted by a multi-layer bonding structure in which a plurality of layers, each consisting of silicon and glass wafers bonded to each other, are stacked on each other, the number of constituent components is large, and the diaphragm thickness and the gap can be reduced at most to about several $\mu$m in practice. Also, reduction of the sensor in size results in reducing the capacitance thereof as well as degrading the sensitivity to a pressure.

As another type of sensor, a so-called thin-film diaphragm type pressure sensor is disclosed in Japanese Patent Laid-Open No. 63-298130. As shown in a cross-sectional view of FIG. 9, a diaphragm structure of this type of pressure sensor is obtained by forming an upper movable electrode 64 and a metal diaphragm 65 on a photosensitive glass substrate 62, on which a lower stationary electrode 61 is formed, through a hollow portion 63, and forming a pressure introducing small hole 66 in the lower surface of the photosensitive substrate 62 to communicate with the hollow portion 63. According to such a structure, the thickness of the diaphragm 65 and the gap size of the hollow portion 63 can be easily reduced to a submicron order. Therefore, this structure is very advantageous to reduce the sensor size.

A pressure sensor is generally required to have high resistance to an excessive pressure in addition to a function of converting a pressure into an electrical signal. For example, a general pressure sensor is required to have a protective function against both positive and negative excessive pressures. For this reason, in the case of the conventional pressure sensor described above, its structure provides a protective function against an excessive pressure applied in a direction to reduce the gap. However, since no stopper function is provided for a pressure applied in a direction to increase the gap, a separate stopper mechanism is required. In the above-described pressure sensor, however, as the size of the sensor is reduced, the displaceable span of the diaphragm becomes very narrow. Therefore, the dimensional tolerance required to mount the stopper mechanism is very limited. Such a small dimensional tolerance makes it very difficult to realize a compact pressure sensor.

SUMMARY OF THE INVENTION

It is an object of the present invention to provide a capacitive pressure sensor which can realize a reduction in size and an increase in sensitivity, and a method of manufacturing the same.

It is another object of the present invention to provide a capacitive pressure sensor having large pressure resistance, a variation of which is small, and a method of manufacturing the same.

It is still another object of the present invention to provide a capacitive pressure sensor which can be easily manufactured by a collective manufacturing process with high precision at low cost, and a method of manufacturing the same.

In order to achieve the above objects, according to the present invention, there is provided a capacitive pressure sensor comprising a substrate, a first hollow portion formed in one surface of the substrate, a first diaphragm having a first film electrode and formed to cover the first hollow portion in the substrate, a second diaphragm opposing the first electrode and stacked on the first diaphragm, a second hollow portion formed between the first and second diaphragms at a portion opposing the first and second film electrodes, and a pressure introducing hole for introducing a pressure under measurement into the first hollow portion.

In addition, according to the present invention, there is provided a method of manufacturing a capacitive pressure sensor, comprising the steps of forming first and second grooves in one and the other surfaces of a substrate, respectively, embedding a first sacrificial layer in the first groove, forming first insulating films on the substrate in which the first sacrificial layer is formed, the first insulating films having a first film electrode stacked therebetween, stacking a second sacrificial layer having a predetermined shape on the first insulating film, forming second insulating films on the first insulating film on which the second sacrificial layer is formed, the second insulating films having a second film electrode stacked therebetween, forming a pressure introducing hole in the second groove formed in the other surface of the substrate to reach the first sacrificial layer, and forming first and second hollow portion by removing the first and second sacrificial layers.

BRIEF DESCRIPTION OF THE DRAWINGS

FIGS. 1A and 1B show the arrangement of a capacitive pressure sensor according to an embodiment of the present invention, in which FIG. 1A is a plan view of the sensor and FIG. 1B is a sectional view taken along a line A—A in FIG. 1A;

FIGS. 3 to 7B show the arrangements of capacitive pressure sensors according to other embodiments of the present invention, in which FIG. 3 to 5 are sectional views of the sensors, FIG. 6A is a plan view of the sensor, and FIG. 6B is a sectional view taken along a line B—B in FIG. 6A, FIG. 7A is a plan view of the sensor, and FIG. 7B is a sectional view taken along a line C—C in FIG. 7A.

DESCRIPTION OF THE PREFERRED EMBODIMENTS

Embodiments of the present invention will hereinafter be described in detail with reference to the accompanying drawings.

Figure 1A:
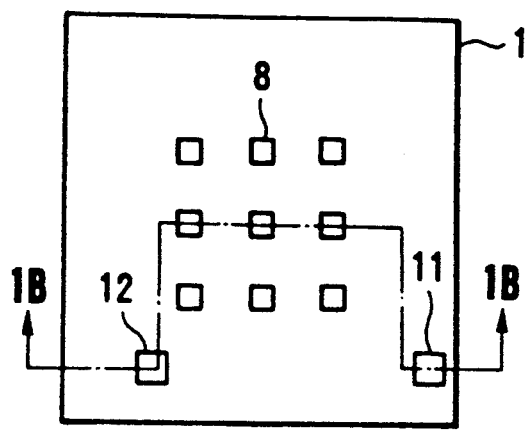
Figure 1B:
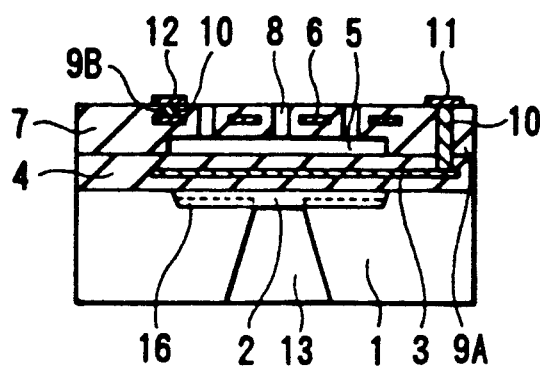

FIGS. 1A and 1B show the arrangement of a capacitive pressure sensor according to an embodiment of the present invention. Referring to FIGS. 1A and 1B, a gap 2 as a shallow first hollow portion having a rectangular shape as a whole and having a U-shaped cross-section is formed in a central portion of the upper surface of a substrate 1. A thin-film diaphragm 4 having a multi-layer structure is formed on the upper surface of the substrate 1 in which the gap 2 is formed. The multi-layer structure is formed such that a thin-film first electrode 3 is stacked between insulating films. The diaphragm 4 includes a stationary peripheral portion and a movable central portion. A gap 5 as a shallow second hollow portion and a stopper 7 are formed on the diaphragm portion 4. The stopper 7 has a diaphragm structure having a substantially rectangular shape as a whole and a multi-layer structure in which a thin-film second electrode 6 is stacked between insulating films. In addition, a plurality of through holes 8 are formed to extend through the insulating films and the electrode 6 of the stopper 7 and communicate with the gap 5. Similarly, openings 9A and 9B are formed through the stopper 7 and in the upper insulating film of the stopper 7 to communicate with the electrodes 3 and 6, respectively. Conductive members 10 are respectively embedded in the openings 9A and 9B. Electrode terminals 11 and 12 are respectively formed on the conductive members 10 to be electrically connected to the electrodes 3 and 6. Furthermore, a second pressure introducing hole 13 is formed in the lower surface of the substrate 1 to communicate with the gap 2.

In this arrangement, the electrode 3 stacked between the thin insulating films is arranged to oppose the electrode 6 stacked between the thin insulating films through the gap 5 so as to form a capacitor structure. When a pressure is introduced from the pressure introducing hole 13, the diaphragm 4 is vertically displaced in accordance with a pressure under measurement. The pressure is then detected based on a change in the capacitance of the capacitor structure due to this displacement.

In addition, according to such an arrangement, the total thickness of the second gap 5, the first gap 2, and the diaphragm portion 4 is small, and the sensor can be manufactured with high precision. Therefore, even if the overall size of the sensor is reduced, a large capacitance and high pressure sensitivity can be ensured. Furthermore, a stopper function can be obtained against a excessive negative pressure as well as against an excessive positive pressure. The diaphragm 4 which substantially includes no stepped portions, thereby provides high resistance to an excessive pressure and less variations in pressure resistance, compared with a diaphragm including stepped portions. In addition, the largely reduced second gap 5 results in providing a large capacitance in the absence of a pressure and a large change in capacitance caused by a displacement of the diaphragm upon application of a pressure, thereby greatly facilitating the realization of a high-sensitive sensor.

Furthermore, in such an arrangement, a pressure may be measured in the following manner. A third electrode 16 indicated by a dotted line in FIG. 1B is formed on the substrate 1 to oppose the diaphragm 4 or the substrate 1 itself is used as a third electrode, and the gaps 2 and 5 are formed in predetermined widths such that a capacitance $C_1$ between the electrodes 3 and 6 becomes equal to a capacitance $C_2$ between the electrodes 3 and 16, wherein a pressure may be measured on the basis of the difference between the capacitance $C_1$ and the capacitance $C_2$. This method, as is effective in doubling the pressure sensitivity and canceling disturbances, is advantageously free of influences of noise. Alternatively, a pressure can be measured by using the capacitance between the first and third electrodes 3 and 16 without using the second electrode 6. Furthermore, a so-called zero-balance pressure measurement method may be employed instead of the method of converting the displacement of the diaphragm 4, caused by a pressure into an electrical signal representing a change in capacitance. More specifically, in this method, an electrostatic attraction $F_1$ generated in accordance with a potential difference $V_1$ between the electrodes 3 and 6, and an electrostatic attraction $F_2$ generated in accordance with a potential difference $V_2$ between the electrodes 3 and 16 are controlled to maintain the capacitance $C_1$ between the electrodes 3 and 6 and the capacitance $C_2$ between the electrodes 3 and 16 constant, and a pressure is measured on the basis of the potential difference $V_1$ and/or the potential difference $V_2$. If the gaps 2 and 5 are very small, the electrostatic attractions are sufficiently large. Therefore, this method can be applied to the structure of this embodiment. According to this method, since the diaphragm is not deformed, various types of error factors caused by diaphragm rigidity can be neglected. It is generally known that the zero-balance measurement method allows high-precision, high-sensitivity measurement.

Figure 2A:
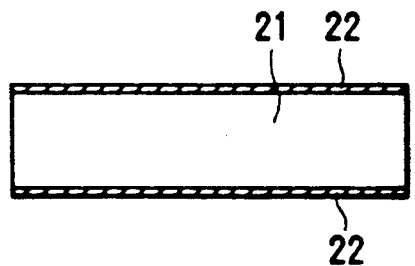
FIGS. 2A to 2I are sectional views showing the steps in a method of manufacturing the capacitive pressure sensor shown in FIGS. 1A and 1B.
Figure 2C:
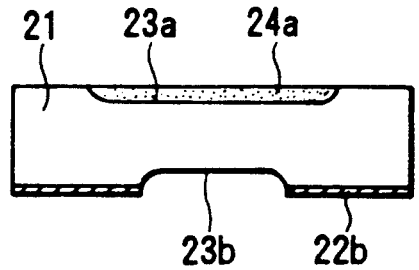
Figure 2B:
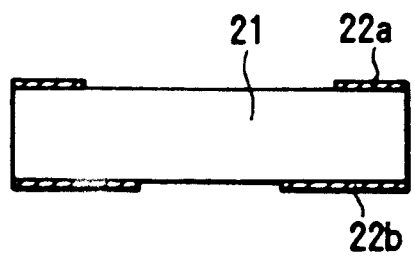
Figure 2D:
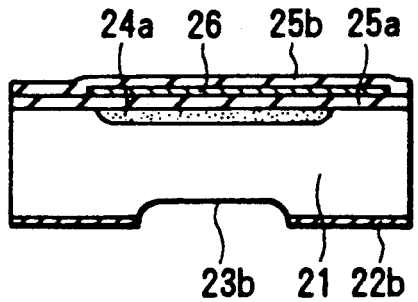
Figure 2E:
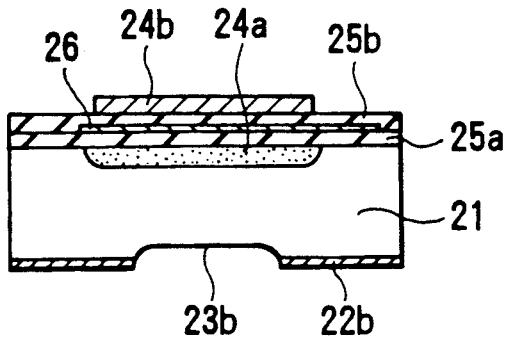
Figure 2H:
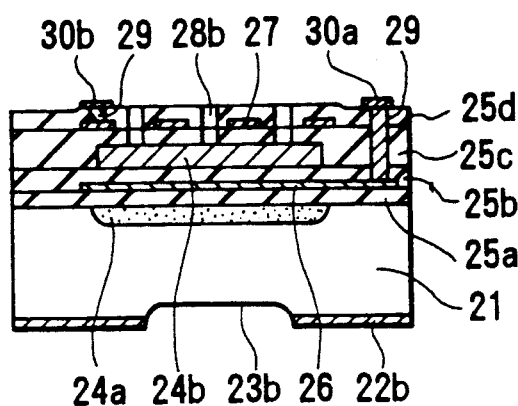
Figure 2F:
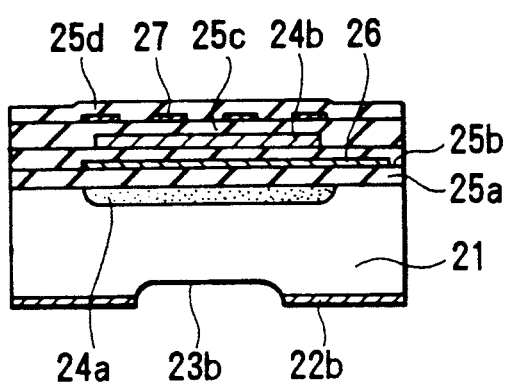
Figure 2I:
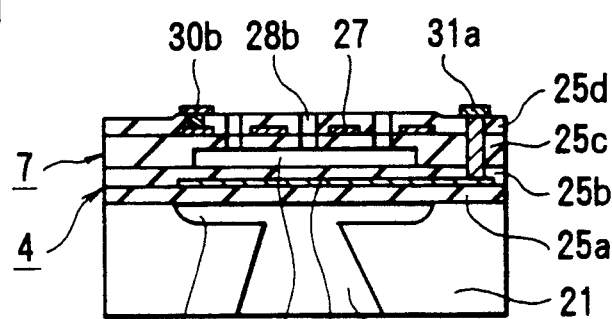
Figure 2G:
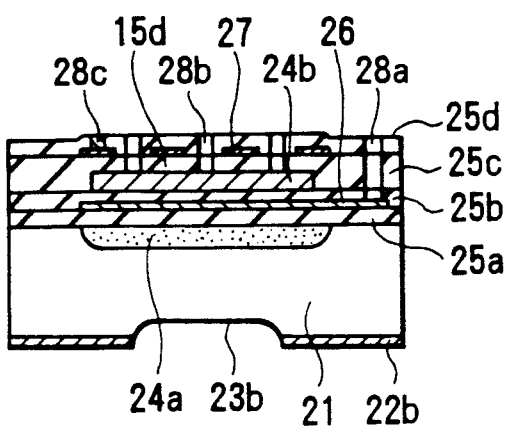

FIGS. 2A to 2I show the steps in a method of manufacturing the capacitive pressure sensor of FIGS. 1A and 1B. As shown in FIG. 2A, films 22 consisting of, e.g., $SiO_2$ or $SiN_x$ are formed on the upper and lower surfaces of, e.g., an Si substrate 21. The film 22 is then formed into predetermined masks 22a and 22b by a known photoetching technique, as shown in FIG. 2B. After the upper and lower surfaces of the Si substrate 21 are etched by using these masks 22a and 22b to form grooves 23a and 23b respectively having predetermined depths, a sacrificial layer material is embedded in the groove 23a formed in the upper surface of the Si substrate 21 to form a first sacrificial layer 24a, as shown in FIG. 2C. Subsequently, as shown in FIG. 2D, a first electrode 26 as a conductive film stacked between first and second insulating films 25a and 25b is formed by an ordinary thin-film forming process on the upper surface of the Si substrate 21 in which the first sacrificial layer 24a is embedded. As shown in FIG. 2E, a sacrificial layer material is stacked on the second insulating film 25b, and etched by a known photoetching technique to form a second sacrificial layer 24b having a predetermined shape. As shown in FIG. 2F, a third insulating film 25c, a second electrode 27, and a fourth insulating film 25d are sequentially stacked on the second insulation film 25b, on which the second sacrificial layer 24b is formed, by an ordinary thin-film forming process. As shown in FIG. 2G, an opening 28a is formed through the films 25d, 25c, and 25b to reach the electrode 26, openings 28b are formed through the films 25d and 25c to reach the sacrificial layer 24b, and an opening 28c is formed through the film 25d to reach the electrode 27. Thereafter, as shown in FIG. 2H, conductive members 29 are respectively embedded in the openings 28a and 28c, and electrode terminals 30a and 30b are respectively formed on the conductive members 29 to be electrically connected to the electrodes 26 and 27. The sacrificial layer 24b is removed through the openings 28b by wet etching to form a gap 5. A pressure introducing hole 13 is then formed in the groove 23b in the lower surface of the Si substrate 21 by wet etching to reach the sacrificial layer 24a. The sacrificial layer 24a is removed through the pressure introducing hole 13 to form a gap 2, thus forming the capacitive pressure sensor shown in FIG. 1 which provides excessive pressure protective functions on both sides of the diaphragm.

Figure 3:
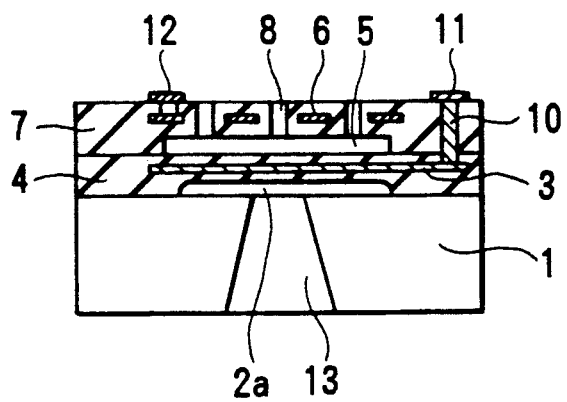

FIG. 3 shows the arrangement of a capacitive pressure sensor according to another embodiment of the present invention. The same reference numerals in FIG. 3 denote the same parts as those in FIG. 1B. The arrangement shown in FIG. 3 is different from that shown in FIG. 1B in that a sacrificial layer 24a is formed on a diaphragm 4 side, and a second gap 2a having a predetermined shape is formed by a photoetching technique instead of forming the groove 23a in the substrate 21 shown in FIGS. 2A to 2I and embedding the sacrificial layer 24a therein.

According to this arrangement, the same effects as those in the arrangement shown in FIG. 1B can be produced except for the effects based on the fact that the diaphragm 4 substantially has no stepped portions.

Figure 4:
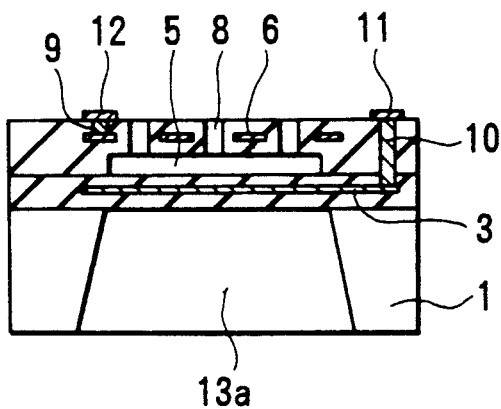

FIG. 4 shows the arrangement of a capacitive pressure sensor according to still another embodiment of the present invention. The same reference numerals in FIG. 4 denote the same parts as those in FIGS. 1A and 1B. The arrangement shown in FIG. 4 is different from that shown in FIGS. 1A and 1B in that the opening area of a pressure introducing hole 13a is increased to obtain a proper diaphragm movable portion instead of forming the gap 2 and the pressure introducing hole 13.

According to this arrangement, although an applicable field of the sensor is limited, since the excessive pressure protective function acts against only a positive or negative pressure, the manufacture of a sensor of this type is facilitated as compared with the sensor shown in FIGS. 1A and 1B, and moreover, a movable diaphragm portion 4 having no stepped portions can e manufactured. Therefore, similar to the sensor shown in FIGS. 1A and 1B, the effects based on the structure having no stepped portions can be obtained.

Figure 5:
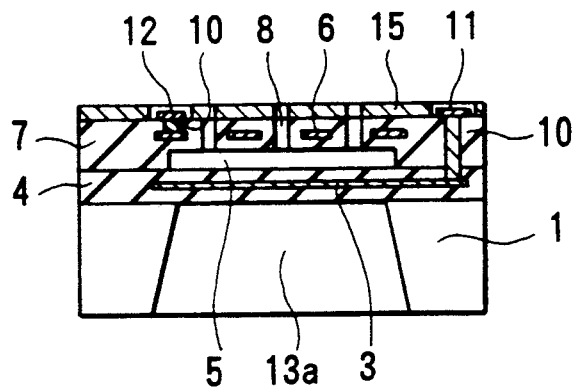
Figure 8:
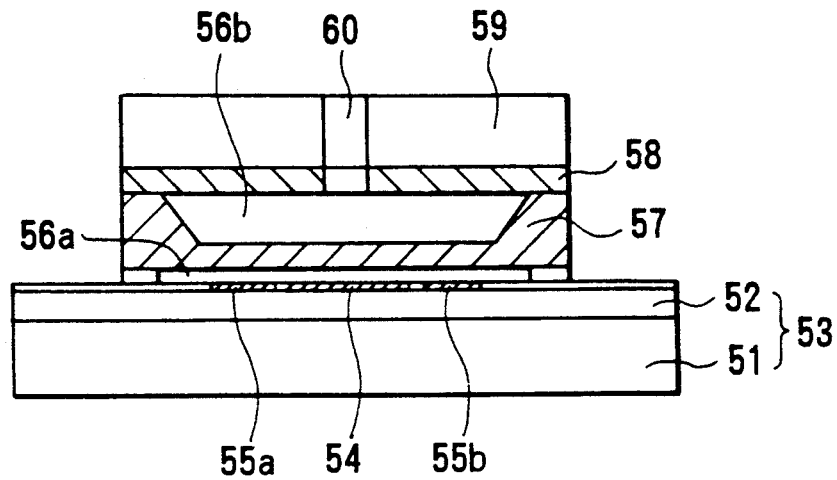
FIGS. 8 and 9 are sectional views respectively showing the arrangements of conventional capacitive pressure sensors.
Figure 9:
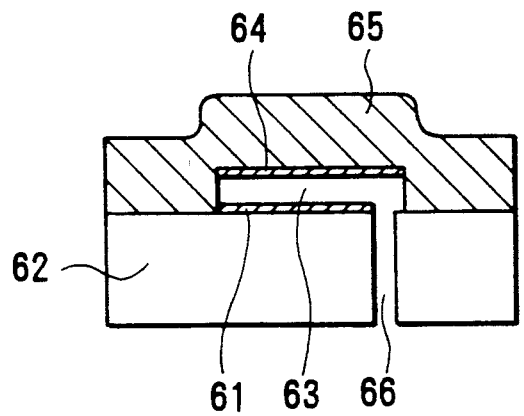

FIG. 5 shows the arrangement of a capacitive pressure sensor according to still another embodiment of the present invention. The same reference numerals in FIG. 5 denote the same parts as those in FIG. 4. The arrangement shown in FIG. 5 is different from that shown in FIG. 4 in that a conductive thin film 15 is formed on a stopper portion 7. Although the structure shown in FIG. 5 is obtained by forming the conductive thin film 15 on the sensor shown in FIG. 4B, the conductive thin film 15 may be formed on the sensor shown in FIG. 1B or 3.

According to such an arrangement, the conductive thin film 15 provides a shield effect and serves as a reinforcing member for the stopper portion 7 in addition to the same effects as described above produced by the whole structure. This structure is not only advantageous to improve the stopper function but also effective in reducing errors in the above-mentioned zero-balance pressure method. More specifically, the first and second gaps 2 and 5 between the electrodes on both sides of the movable diaphragm are controlled to be constant by using electrostatic attractions. In this case, in order to perform pressure measurement with high precision, the second and third electrodes opposing the first electrode of the movable diaphragm 4 are preferably constituted by rigid members. In the structures shown in FIGS. 1B, 3, and 4, the stopper may lack in rigidity. In such a case, the structure shown in FIG. 5 can be effectively used to supplement the rigidity.

FIGS. 6A and 6B show the arrangement of a capacitive pressure sensor according to still another embodiment of the present invention. The same reference numerals in FIGS. 6A and 6B denote the same parts as those in FIGS. 1A and 1B. The structure shown in FIGS. 6A and 6B is different from that shown in FIGS. 1A and 1B in that a pressure introducing hole 14 is formed on the upper surface side of a substrate 21 to communicate with a gap 2 instead of forming the pressure introducing hole 13 in the lower surface of the substrate 1. A pressure under measurement is introduced into the pressure introducing hole 14. In addition to producing the same effects as described above, the present embodiment can omit the step of forming the hole 13 through the substrate, so that the overall manufacturing processes can be simplified accordingly.

FIGS. 7A and 7B show the arrangement of a capacitive pressure sensor according to still another embodiment of the present invention. The same reference numerals in FIGS. 7A and 7B denote the same parts as those in FIGS. 1A and 1B. Referring to FIGS. 7A and 7B, two structures, each identical to the structure shown in FIGS. 1A and 1B, are integrally formed adjacent to each other. In one structure, a pressure measuring portion 40a having a pressure introducing hole 13b is formed. In the other structure, instead of forming the pressure introducing hole 13, a pressure introducing hole 14b is formed on the upper surface side of a substrate 1 to communicate with a gap 2, thus forming a reference capacitance portion 40b.

According to this arrangement, the reference capacitance portion 40b on the other structure can be used as a reference capacitor structure which is not sensitive to a pressure. Such a structure can be obtained by forming the structures shown in FIGS. 1A and 1B and 6A and 6B to be adjacent to each other.

It should be noted that, when a pressure is converted into a capacitance value by one of the capacitive pressure sensors shown in FIGS. 1A to 7B, a careful consideration must be given to a stray capacitance included in a measured capacitance value. More specifically, in order to measure the capacitance between the opposite electrodes, the opposite electrodes are connected to a measuring circuit, wherein the stray capacitance of leads extending from the opposite electrodes to the measuring circuit is added to the capacitance between the opposite electrodes. If this stray capacitance greatly varies, the measurement precision of the pressure sensor is degraded accordingly. In order to solve such a problem, the substrate 1 of each of the capacitive pressure sensors shown in FIGS. 1A to 7B may be constituted by a semiconductor substrate, e.g., a monocrystalline silicon substrate, and a capacitance measuring circuit or a part thereof may be formed near a pressure sensor mechanism on the semiconductor substrate.

According to the above-mentioned arrangement, since the stray capacitance between the opposite electrodes and the capacitance measuring circuit can be greatly reduced, the variation in stray capacitance is suppressed. Therefore, the precision of the pressure sensor can be improved accordingly. Alternatively, instead of improving the precision, the size of the pressure sensor structure may be further decreased. In this case, since the capacitance measurement circuit is also mounted on the substrate 1, the pressure sensor measurement system can be greatly reduced in size as a whole.

In the above-described embodiment, in order to obtain the Si substrate 21 having a flat surface, the groove 23a having a U-shaped cross-section is formed in the Si substrate 21, and the sacrificial layer 24a is embedded in the etching groove 23a. However, the present invention is not limited to this method. For example, an n-type Si substrate may be used as the Si substrate 21, and a p-type impurity is selectively diffused in the substrate at a high concentration to form a diffusion layer as a buried layer. In this case, after an opening is formed in the lower surface of the n-type Si substrate to reach the buried layer, the hollow portion 2 is formed by selectively etching the buried layer by using an etching solution containing, e.g., hydrofluoric acid:nitric acid:acetic acid = 1:3:8. With this process, the diaphragm portion 4 having the same structure as described above can be formed.

Furthermore, although in each embodiment described above, the movable diaphragm portion has a rectangular shape, the present invention is not limited to this shape. It is apparent that the movable diaphragm portion may have a polygonal or round shape.

As has been described above, according to the present invention, since a thin-film diaphragm is formed, as a thin-film multi-layer structure, closely and in parallel to the upper surface of a substrate, a small hollow portion can be formed between capacitor electrodes with high precision, thus obtaining a large capacitance. In addition, a change in capacitance caused by a change in pressure is large, and the resistance to an excessive pressure can be enhanced, so that a compact pressure sensor having high sensitivity and high pressure resistance can be provided.

Moreover, according to the foregoing arrangements, high-precision, low-cost, compact pressure sensors can be easily manufactured by a collective manufacturing process.

What is claimed is:

1. A capacitive pressure sensor comprising:
a substrate;
a first hollow portion formed in one surface of said substrate;
a first diaphragm having a first film electrode and formed to cover said first hollow portion in said substrate;
a second diaphragm having a second film electrode opposing said first film electrode and stacked on said first diaphragm;
a second hollow portion formed between said first and second diaphragms at a portion opposing said first and second film electrodes; and
a pressure introducing hole for introducing a pressure under measurement into said first hollow portion.

2. A sensor according to claim 1, wherein said first and second diaphragms are formed by forming said first and second film electrodes between insulating films, respectively.

3. A sensor according to claim 1, wherein said second diaphragm has a through hole communicating with said second hollow portion.

4. A sensor according to claim 1, further comprising a third electrode formed on a first hollow portion side in said substrate to oppose said first film electrode.

5. A sensor according to claim 4, wherein said substrate is constituted by a metal plate, and said metal plate constitutes said third electrode.

6. A sensor according to claim 1, wherein said pressure introducing hole communicating with said first hollow portion is formed to be open to said second diaphragm through said first diaphragm.

7. A sensor according to claim 1, further comprising a conductive film formed on a surface, of said second diaphragm, which is located on a side opposite to said substrate.

8. A capacitive pressure sensor comprising:
a substrate;
a pair of first hollow portions formed abreast in one surface of said substrate;
a pair of first diaphragms having first film electrodes and formed to cover said first hollow portions in said substrate, respectively;
a pair of second diaphragms having second film electrodes opposing said first film electrodes and stacked on said first diaphragms, respectively;
a pair of second hollow portions respectively formed between said first and second diaphragms at portions opposing said first and second film electrodes;
a first pressure introducing hole formed in said substrate to communicate with one of said first hollow portions; and
a second pressure introducing hole communicating with the other first hollow portion and extending through said first diaphragm to be open to said second diaphragm.

9. A method of manufacturing a capacitive pressure sensor, comprising the steps of:
forming first and second grooves in one and the other surfaces of a substrate, respectively;
embedding a first sacrificial layer in said first groove;
forming first insulating films on said substrate in which said first sacrificial layer is formed, said first insulating films having a first film electrode stacked therebetween;
stacking a second sacrificial layer having a predetermined shape on said first insulating film;
forming second insulating films on said first insulating film on which said second sacrificial layer is formed, said second insulating films having a second film electrode stacked therebetween;
forming a pressure introducing hole in said second groove formed in the other surface of said substrate to reach said first sacrificial layer; and
forming first and second hollow portions by removing said first and second sacrificial layers.

10. A method of manufacturing a capacitive pressure sensor, comprising the steps of:
forming a buried layer capable of being etched in one surface of a substrate;
forming a groove in the other surface of said substrate;
forming first insulating films on said substrate in which said buried layer is formed, said first insulating films having a first film electrode stacked therebetween;
stacking a sacrificial layer having a predetermined shape on said first insulating film;
forming second insulating films on said first insulating film on which said sacrificial layer is formed, said second insulating films having a second film electrode stacked therebetween;

etching said groove formed in the other surface of said substrate to form an opening reaching said buried layer; and forming first and second hollow portions by removing said buried layer and said sacrificial layer.

11. A capacitive pressure sensor comprising:

a substrate;

a first diaphragm having a first film electrode and a first hollow portion formed in a surface of said first diaphragm, said first hollow portion opposing said substrate;

a second diaphragm opposing said first film electrode and stacked on said first diaphragm;

a second hollow portion formed between said first and second diaphragms at a portion opposing said first and second film electrodes; and a pressure introducing hole for introducing a pressure under measurement into said first hollow portion.

12. A capacitive pressure sensor comprising:

a substrate;

a pressure introducing hole having a large open area in one surface of said substrate;

a first diaphragm having a first film electrode;

a second diaphragm opposing said first film electrode and stacked on said first diaphragm;

a hollow portion formed between said first and second diaphragms at a portion opposing said first and second film electrodes, said pressure introducing hole for introducing a pressure under measurement into said hollow portion.

* * * * *